United States Patent [19]

Laird et al.

[11] Patent Number: 5,802,144
[45] Date of Patent: Sep. 1, 1998

[54] MINIMUM COMMON SPAN NETWORK OUTAGE DETECTION AND ISOLATION

[75] Inventors: Robert Laird; William D. Croslin; Craig Hayes; Bruce Stewart, all of Colorado Springs, Colo.

[73] Assignee: MCI Corporation, Washington, D.C.

[21] Appl. No.: 632,198

[22] Filed: Apr. 15, 1996

[51] Int. Cl.$^6$ .................. H04M 1/24; H04M 3/08; H04M 3/22

[52] U.S. Cl. .................. 379/32; 379/1; 379/12; 379/22; 379/26; 370/242; 370/248

[58] Field of Search ................ 379/32, 33, 34, 379/35, 27, 29, 2, 17, 1, 9, 10, 15, 12, 14, 16, 22, 26; 370/242, 359, 245, 246, 265, 217, 221, 225, 241, 244, 248, 252, 250

[56] References Cited

U.S. PATENT DOCUMENTS

| | | | |
|---|---|---|---|
| 5,049,873 | 9/1991 | Robin et al. | 340/825.06 |
| 5,146,452 | 9/1992 | Pekarske | 379/2 |
| 5,233,600 | 8/1993 | Pekarske | 370/244 |
| 5,282,200 | 1/1994 | Dempsey et al. | 370/217 |
| 5,457,729 | 10/1995 | Hamann et al. | 379/2 |
| 5,473,596 | 12/1995 | Garafola et al. | 379/33 |
| 5,495,471 | 2/1996 | Chow et al. | 370/217 |
| 5,537,532 | 7/1996 | Chug et al. | 395/182.02 |
| 5,623,481 | 4/1997 | Russ et al. | 370/225 |
| 5,636,203 | 6/1997 | Shah | 370/244 |
| 5,657,320 | 8/1997 | Russ et al. | 370/217 |

*Primary Examiner*—Curtis Kuntz
*Assistant Examiner*—Binh K. Tieu

[57] ABSTRACT

A method and related system dynamically determines the location of a network outage in a telecommunications network. A plurality of alarm generating network equipments are located at spaced sites along the network. Alarms are generated upon the detection of problems with a signal passing through continuous signal trunks connected between the alarm generating network equipments. The alarm data from the alarm generating network equipments is connected at a single point. Network topology data is stored in a database, defining the relative locations of the alarm generating network equipments in the network and their respectively connected trunks. The alarmed equipment ports are correlated with respective connected alarmed trunks from data obtained in the database as well as collected alarm data. The alarmed trunks are analyzed for identifying the corresponding minimum number of alarm generating network equipments that exist between the alarmed trunks thereby defining effected inter-equipment trunks. The alarmed trunks passing through a particular inter-equipment trunk are analyzed. The analysis then establishes a minimum common span of all alarmed trunks that pass through the inter-equipment trunk, and along which the outage occurs.

10 Claims, 2 Drawing Sheets

MINIMUM COMMON SPAN NETWORK OUTAGE DETECTION AND ISOLATION

FIELD OF THE INVENTION

This invention relates in general to telecommunications networks, and more specifically to methods and apparatus for detecting and isolating a fiber outage in a network.

BACKGROUND OF THE INVENTION

Special outage detection and isolation capabilities exist in any large telecommunications network. A disruption in a telecommunications network can be very expensive to both the provider of the network services and the many users of the network. For the provider, a network disruption results in lost revenue for the duration of the outage. In addition, there is a possible opportunity cost associated with dissatisfied customers who refrain from doing further business with the network provider and new customers who pass up the opportunity of doing business with the network provider.

One of the important factors in the length of the disruption is the time it takes to detect that a disruption has taken place and the isolation of the location. Due to the above factors, time is of the essence, and a very fast means of detection and isolation is important in order to minimize the disruption to both the network provider and the network users.

Network alarms for a major fiber break fall into two categories: lightwave alarms which indicate the absence of light reception on either side of the break, and alarms from individual monitoring points in the network which indicate that a signal is not being received. Lightwave alarms are generally issued from light regenerators, which amplify signals flowing through a fiber. The receipt, analysis, and confirmation of lightwave alarms can usually be measured in a span of minutes. With respect to alarms from monitoring points, certain alarm generating network elements deliver alarms indicating loss of service. These monitoring points represent hardware that is distinct from the repeaters. The receipt of large numbers of these latter alarms within a few seconds, and the persistence of the alarms provides the data and confirmation necessary to identify that a major fiber outage has taken place. Further, this detailed information from monitoring points is available to a centralized analysis platform within seconds.

A major problem with prior art approaches is the reliance upon lightwave alarms from regenerators. As just mentioned, analysis and confirmation of the lightwave alarms usually takes minutes. This is in marked contrast to the alarms from alarm generating network elements which become available in a matter of seconds. Accordingly, it would be desirable to perform at least initial detection of outage on the basis of alarms from the alarm generating network elements.

BRIEF DESCRIPTION OF THE PRESENT INVENTION

Alarms are received from network devices indicating the occurrence of an error state from either a lightwave transmission element or the loss of signal at a monitoring and control unit such as an alarm generating network element device. These monitoring and control units provide a means for fast detection of a network outage. Alarms from these devices are provided via connections to a centralized outage detection and isolation device. The connections are dedicated, diverse links which provide very fast (about 1 second) notification of an alarm state.

The summarization of these alarms at a centralized monitoring point provides a means of confirming the alarms as persistent in nature, rather than intermittent. It allows the quick identification that a major fiber break has taken place (DETECTION).

The correlation of these alarms with the topology of the network will then result in identifying the common span of the network which is in alarm and at which the outage has taken place (ISOLATION). The speed with which this monitoring alarm information is obtained and analyzed at a centralized location provides a very fast means of network outage detection and isolation.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Although the invention is useful for a variety of outage detection and isolation applications, it can be described very simply in the context of a fiber outage within an interexchange carrier network.

Figure 1:
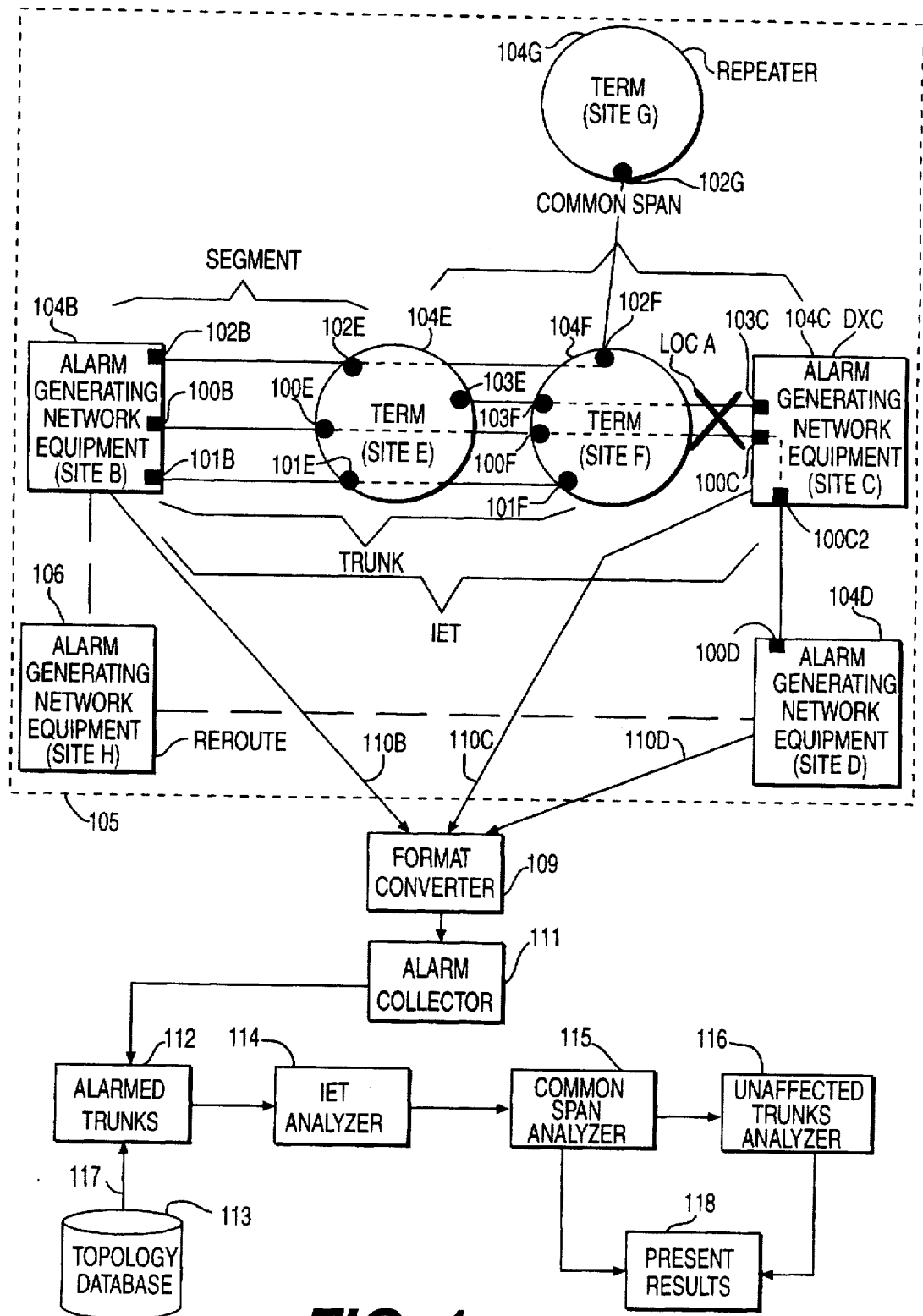
FIG. 1 is a block diagram showing operative components of the system in accordance with the invention.

In FIG. 1, for example, a long distance network, such as network 105, can be described as made up of a variety of sites. For the purposes of this exposition, the sites can be described as either a site containing one or more alarm generating network equipment elements 104B–104D, or a site which includes a different type of equipment and will hereafter be described as a Terminal (TERM) 104E–104G. Typically, a Terminal will be a conventional lightwave regenerator with signal absence detecting means. An alarm generating network equipment element is a common, state of the art hardware network element. One such example of this type of equipment is a Digital Cross Connect (DXC), which is able to cross connect signals at a particular multiplexing level from either local or remote commands. This is one example of an alarm generating network equipment element. Note that the current invention is not limited to such equipment. An alarm generating equipment will provide alarms when there is a signal loss or other such attenuation in the ability of signal to be transmitted or received, in addition to its function of connecting network paths.

Within FIG. 1, for example, network 105 consists of network capacity which traverses the network by connecting diverse network equipment elements, as in sites B, C, D, E, F, and G (104B–104G). Each piece of this network capacity which connects two diverse network equipment elements can be referred to as a "segment", as in 102B–102E. A segment is said to be attached to a specific "port" of a network equipment element, as in 102B. In order to transmit/receive signals through the network, network capacity (segment) must be connected together within the network equipment element. This is done by electronically connecting two ports together within the same network equipment element as in 100C-100C2, thereby joining two different segments together. This joined network capacity can be referred to as a "trunk", where a trunk consists of one or more segments as in 100B-100E-100F-100C-100C2-100D.

In network 105, we have displayed the connections for the following trunks:

Trunk 100: Site B(100B)-Site E(100E)-Site F(100F)-Site C(100C, 100C2)-Site D(100D)
Trunk 101: Site B(101B)-Site E(101E)-Site F(101F)
Trunk 102: Site E,(102B)-Site E(102E)-Site F(102F)-Site G(102G)
Trunk 103: Site E(103E)-Site F(103F)-Site C(103C)

For example, trunk 100 connects traffic between distant sites B (104B) and D (104D). The trunk is represented in terms of its logical connections between the end sites and the intermediate sites. In reality, the logical connections are carried on some physical transmission device such as a lightwave fiber optic repeater. Trunk 100 transverses site B (104B) and terminal sites (repeaters) E (104E) and F (104F) at the lightwave level; the trunk then traverses site C (104C) and site D (104D). While FIG. 1 shows only six sites and four trunks, it will be understood, of course, that there will, at any time, probably be numerous sites and trunks, all of which must be handled for outage detection purposes by the invention. In fact it is an object of the invention to simultaneously handle a multitude of alarms from many alarm generating equipment network devices, and to correlate all of these alarms and identify the location of a major fiber outage. Subsequent reliance on slower terminals (repeaters) in the network adds specificity of outage location.

In network 105, Location A is assumed as a location where a fiber break has occurred. It will be used in explaining the algorithm.

The alarm generation 110B-110D is produced by means of very fast links at each alarm generating equipment network element 104B-104D in the network delivered to a centralized network alarm collector 111, through a format converter. The links have been engineered to send and receive data in as fast a time as possible. Occurrence of an alarm indicates that the hardware device has encountered an abnormality that requires immediate attention. All of the alarms that affect the ability of the network to complete signal transmission are reported to the alarm collector 111. Examples of such alarms include AIS—Alarm Indication Signal, LOF—Loss Of Frame, and LOS—Loss Of Signal. The signaling communications between the alarm collector 111 and the links 110-110D on the alarm generating equipment network element devices 104B-104D in network 105 may be in accordance with the well knownX.25 packet switching standard.

Since the various alarm generating equipment network elements 104B-104D may be of diverse manufacture, the alarm data collected from them may inherently be in different formats. It is preferable therefore to put the alarm data through a format converted so that it is presented to the alarm collector 111 in a uniform format. Accordingly, a format converter 109 is included in the arrangement of FIG. 1 to accept the alarm data and to reformat that data as needed for uniform presentation to the alarm collector 111. The invention is therefore not limited to use with alarm generating equipment of a single manufacturer but has a more universal utility. As is well known, alarm generating equipment are themselves well adapted to provide the kind of data used for determining network faults. For example, the data mentioned above on alarms is readily provided by equipment of the type commercially available and widely used.

Processes for converting from one format to another are also well known in a number of contexts, and the format converter 109 is preferably implemented by the same computer or processor which provides the alarm collecting function of alarm collector 111. Alternatively, of course, the format converter 109, may be a stand alone device. The exact implementation in any particular case is a matter of design choice for anyone of ordinary skill in the art.

In accordance with the invention, information from the various alarm generating equipment network elements 104B-104D identifying network problems will be provided to the alarm collector 111. The alarm collector may be a VAX computer as available from Digital Equipment Corporation.

It will be recognized that the Topology Database 113 contains all of the logical representations corresponding to the physical network 105. Connected to Database 113 is an alarmed trunks system 112 which stores the alarms from the alarm collector in 111 and correlates the location of the alarmed equipments with the Topology Database 113 to create a set of alarmed trunks. This provides data on all of the alarm points and alarmed trunks, in a specific window of time, to the IET analyzer 114. The Alarmed Trunks system 112 may also be a VAX computer interconnected to the Database 113 by an ethernet connection which is shown in FIG. 1 as connection 117.

The IET analyzer unit 114 is effectively implemented by using a VAX computer (available from Digital Equipment Corporation), programmed to determine the location of alarm generating equipment between which a major fiber outage has occurred. The resulting path is also known as an Inter-Equipment Trunk (IET). Note that the alarm generating equipment 104B-104D has been engineered such that only the ports facing the network problem alarm. Therefore, in network 105, a network problem at Location A will cause, on trunk 100, port 100B, 100C, and 100D to alarm. Port 100C2 will not alarm. Port 100B, 100C, and 100D are the ports nearest to the network problem on each alarm generating equipment. For example, at the equipment 104C at site C, port 100C2 is not a near port because port 100C is closer to location A.

The information on the IET produced by analysis unit 114 is provided to the Common Span an analyzer unit 115. The Common Span analyzer unit 115 is effectively implemented by using a VAX computer (Available from Digital Equipment Corporation), and determines the common span of all alarmed trunks that exist along the aforementioned IET.

The common span resulting from Common Span analyzer unit 115 is provided to a presentation system 118 which is adapted to visually display the location of the network break. The presentation system 118 may be configured from a VAX workstation with a standard windowing capability. This allows the user to review historical information as well as information relating to the current set of alarms.

The information on the portion of the IET that makes up the common span of all analyzed alarms provided by the Common Span analyzer unit 115 is provided to the Unaffected Trunks Analyzer 116. The Unaffected Trunks analyzer unit 116 is effectively implemented by using a VAX computer (available from Digital Equipment Corporation), to use information on trunks passing through the common span previously determined by Common Span analyzer unit 115. The Unaffected Trunks analyzer unit 116 will examine all trunks which pass through said common span of the network for alarm status. These trunks are then divided into two sets: trunks which have alarmed and are therefore affected by the outage and those trunks which have not alarmed and are therefore unaffected. Trunks which have alarmed are of no use to the Unaffected Trunks analyzer and are deleted. If the set of unaffected trunks is null, then this analysis cannot proceed further. If the set of unaffected trunks is not null, then the topology of the set is analyzed further. The segments of the unaffected trunks which match segments within the Common Span from Common Span analyzer unit 115 can then be eliminated, therefore producting a more precise result. The final result from Unaffected Trunks analyzer 116 is provided to a presentation system 118 which is adapted to visually display the location of the network break.

EXAMPLE

For the process of determining the common span, as previously mentioned, all of the network alarms from the alarm generating equipment network elements 104B–104D are gathered in a common format by the alarm collector, 111. In the example from network 105, a break at Location A would result in the following alarms:

100B, 100C, 100D
103C

The alarmed trunks identified by unit 112 would therefore be trunk 100 and trunk 103.

The IET Analyzer, unit 114, would identify from trunk 100, that equipment ports 100B and 100C are both in alarm. It will be noted from network 105 that these ports point to each other, i.e., they form the ends of an Inter Equipment Trunk (IET). This confirms that the outage affecting this trunk is somewhere along the topology associated with that IET. Therefore, the outage location has been narrowed from anywhere in the network to between sites B (104B) and C (104C). It should be noted that in a typical real network, many more trunks and IETs will be in alarm than 1 or 2. However, this example is sufficient to explain the analysis technique.

The Common Span analyzer, unit 115, works with the topology of all of the alarmed trunks. The topology for the alarmed trunks from the example from network 105, is as follows:

100. B-E-F-C-D
103. E-F-C

It will be noted from the above that the common span between the two affected trunks is E-F-C. The results of the analysis can be displayed for action by network personnel via the Present Results unit 118.

Further granularity can sometimes be obtained by further analysis of unaffected trunks that route through the common span point. It will be noted from the network 105 that the following trunks pass through the common span E-F-C and remain unaffected:

102. B-E-F-G

The Unaffected Trunks analyzer unit 116 examines all unaffected trunks, such as trunk 102, and eliminates any portion from the common span that is traversed by such an unaffected trunk. Therefore E-F can be eliminated from E-F-C, producing a result of F-C. It should be noted that the Location A where the outage occurred in network 105 occurs between sites F (104F) and C (104C). The final results of this analysis can be displayed for action by network personnel via the Present Results unit 118.

FLOWCHART

Figure 2:
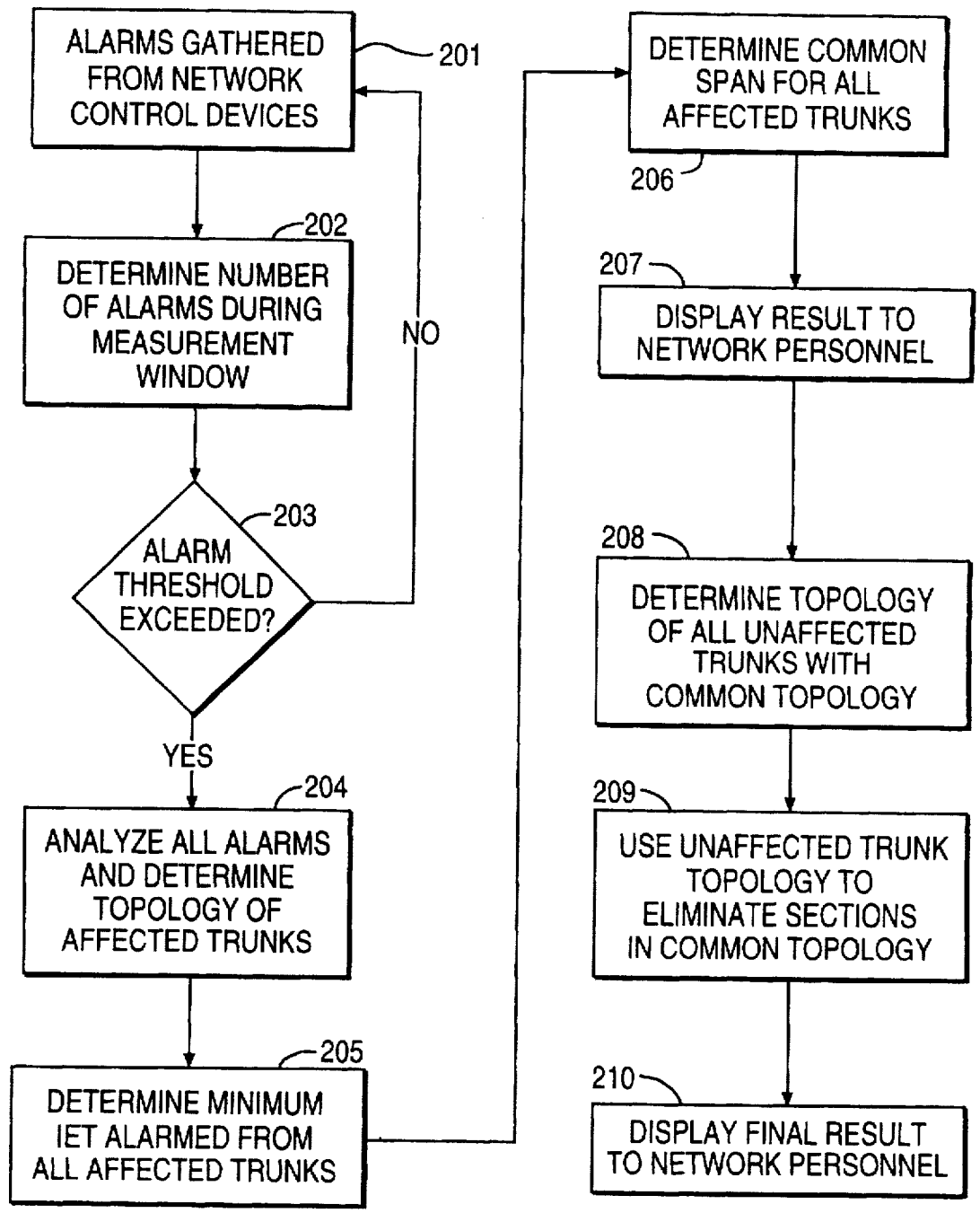
FIG. 2 presents a flow chart of operative steps carried out in one form of the invention.

The flowchart of FIG. 2 depicts the overall operative steps of the invention. It may be observed that the operation depicted is cyclical, and the process repeats itself continually. Initially, at step 201, alarms are gathered which are indicative of the state of the network. It will be recalled that the alarm data is obtained after processing through a format converter 110 and alarm collector 111. The alarm gathering process constantly checks at step 202 and 203 to determine if enough alarms have been processed within a particular timing window to warrant further analysis. In the case of a major fiber outage in a typical interexchange carrier network, alarms will number in the hundreds or thousands, and will be available in a very few seconds. Steps 202 and 203 will therefore eliminate any spurious network events which are inconsequential.

Once it has been determined that there is a major outage event, all of the alarms for the measurement window will be gathered and have their network topology determined in step 204. The alarms correspond to 'ports' on a 'trunk'. The alarm information from the alarm generating network element contains information corresponding to a port. The port can then be used to access the topology database 113 and identify the trunk that is affected. A trunk affected by an outage which passes through any alarm generating network elements 104B–104D may have one or more than one port on it which goes into alarm.

The next set of steps are analysis steps used to achieve a very quick narrowing down of where the location of the outage exists. Step 205 has as its purpose the identification of the Inter Equipment Trunk (B-E-F-C) which identifies where the outage is located. This narrows down the location of the outage as being between the locations of the alarm generating equipment. Step 206 will then further narrow down the common span (E-F-C) by determining the common span of all alarmed trunks that pass through the aforementioned IET. This result is then displayed to network personnel in step 207.

The last analysis step will identify all trunks that pass through the common span identified in step 206. Any such trunks identified in step 208 which do not have any alarm points and which are monitored by alarm generating network equipment (B-E-F-C) can then be used to identify portions of the common span which can be eliminated (E-F) in step 209. This final result (F-C) is then displayed to network personnel via step 210.

With continued reference to FIG. 1, a simplified restoration of service between site B (104B) and site D (104D) is seen to be provided through another alarm generating network equipment 106, at a different site H. In the simplest sense, such rerouting can be accomplished after location A has been determined, thereby permitting site D to remain active in the network. Of course, after the problem at location A has been repaired, further rerouting for restoration of service would be unnecessary.

It should be understood that the invention is not limited to the exact details of construction shown and described herein for obvious modifications will occur to persons skilled in the art.

We claim:

1. A telecommunications system for dynamically determining the location of a network outage comprising:

a telecommunications network;

a plurality of alarm generating network equipments located at spaced sites along the network for generating alarms upon the detection of problems with a signal passing therethrough;

a plurality of continuous signal trunks connected between the alarm generating network equipments;

means for collecting alarm data from the alarm generating network equipments at a single point;

a topology database defining the relative locations of the alarm generating network equipments in the network and their respectively connected trunks;

means connected between the topology database and the collecting means for correlating alarmed equipment ports with respective connected alarmed trunk;

means for analyzing the alarmed trunks for identifying the corresponding minimum number of alarm generating network equipments that exist between the alarmed trunks thereby defining effected inter-equipment trunks; and analyzing means for
a) determining all the alarmed trunks passing through a particular inter-equipment trunk; and
b) establishing a minimum common span of all alarmed trunks that pass through the inter-equipment trunk, and along which the outage occurs.

2. A telecommunications system as defined in claim 1 further comprising unaffected trunk analyzing means for eliminating sections along the common span that are not themselves effected by an alarm, thereby establishing a shorter path along which the outage occurs.

3. A telecommunications system as defined in claim 1 further comprising means connected to the common span analyzing means for displaying the common span along which the e outage occurs.

4. A telecommunications system as defined in claim 1 wherein the terminal is a lightwave repeater.

5. A telecommunications system as defined in claim 1 wherein the alarm generating network equipment is a digital cross connect device.

6. A telecommunications system as defined in claim 2 further comprising means connected to the unaffected trunk analyzing means for displaying the shorter path along which the outage occurs.

7. A method for dynamically determining the location of a network outage in a telecommunications network, the method comprising the steps:

locating a plurality of alarm generating network equipments at spaced sites along the network;

generating alarms upon the detection of problems with a signal passing through the alarm generating network equipments;

connecting a plurality of continuous signal trunks between the alarm generating network equipments;

collecting alarm data from the alarm generating network equipments at a single point;

storing network topology data in a database, defining the relative locations of the alarm generating network equipments in the network and their respectively connected trunks;

correlating alarmed equipment ports with respective connected alarmed trunk from data obtained from the database as well as collected alarm data;

analyzing the alarmed trunks for identifying the corresponding minimum number of alarm generating network equipments that exist between the alarmed trunks thereby defining effected inter-equipment trunks;

analyzing all the alarmed trunks passing through a particular inter-equipment trunk; and establishing a minimum common span of all alarmed trunks that pass through the inter-equipment trunk, and along which the outage occurs.

8. The method set forth in claim 7 together with the step of determining unaffected trunks along the common span for eliminating these sections along the common span thereby establishing a shorter path along which the outage occurs.

9. The method set forth in claim 7 together with the step of displaying the common span, along which the outage occurs.

10. The method set forth in claim 7 together with the step of displaying the shorter path along which the outage occurs.

* * * * *